United States Patent [19]

Ando

[11] 4,117,272

[45] Sep. 26, 1978

[54] START CIRCUIT FOR TELEPHONE ANSWERING DEVICE

[75] Inventor: Shizuo Ando, Kawagoe, Japan

[73] Assignee: Pioneer Electronic Corporation, Tokyo, Japan

[21] Appl. No.: 792,370

[22] Filed: Apr. 29, 1977

[30] Foreign Application Priority Data

Apr. 30, 1976 [JP] Japan .................. 51-48500

[51] Int. Cl.² ............................................. H04M 1/64
[52] U.S. Cl. ................................. 179/84 R; 179/6 E
[58] Field of Search ................ 179/84 R, 84 A, 84 L, 179/84 T, 6 R, 6 E, 2 R, 2 A

[56] References Cited

U.S. PATENT DOCUMENTS

| 3,702,904 | 11/1972 | Bard | 179/2 A |
|---|---|---|---|
| 3,783,193 | 1/1974 | Lee | 179/2 A |
| 3,876,836 | 4/1975 | Langan | 179/2 A |
| 4,049,916 | 9/1977 | Danner | 179/84 R |

*Primary Examiner*—Kathleen H. Claffy
*Assistant Examiner*—Joseph A. Popek
*Attorney, Agent, or Firm*—Sughrue, Rothwell, Mion, Zinn and Macpeak

[57] ABSTRACT

A start circuit for a telephone answering device for distinguishing between a standard 16 Hz bell signal with a repeating one second on — two second off pattern, and extraneous dial signals having ten pulses or less. The number of sequential input pulses are accumulated in a first binary counter $BC_1$ whose "4" and "8" stages are coupled to a NAND gate $G_4$, and the number of successive input bursts each containing at least 12 pulses are accumulated in a second binary counter $BC_2$ in response to the NAND gate output. A final, bell signal recognition output is produced when the second counter registers a predetermined count. The first counter is reset approximately 0.3 second after the termination of a first input burst in preparation for a possible second burst, while the second counter holds its count for approximately 5 seconds. The NAND gate output also disables the first counter after a count of 12 is reached.

6 Claims, 1 Drawing Figure

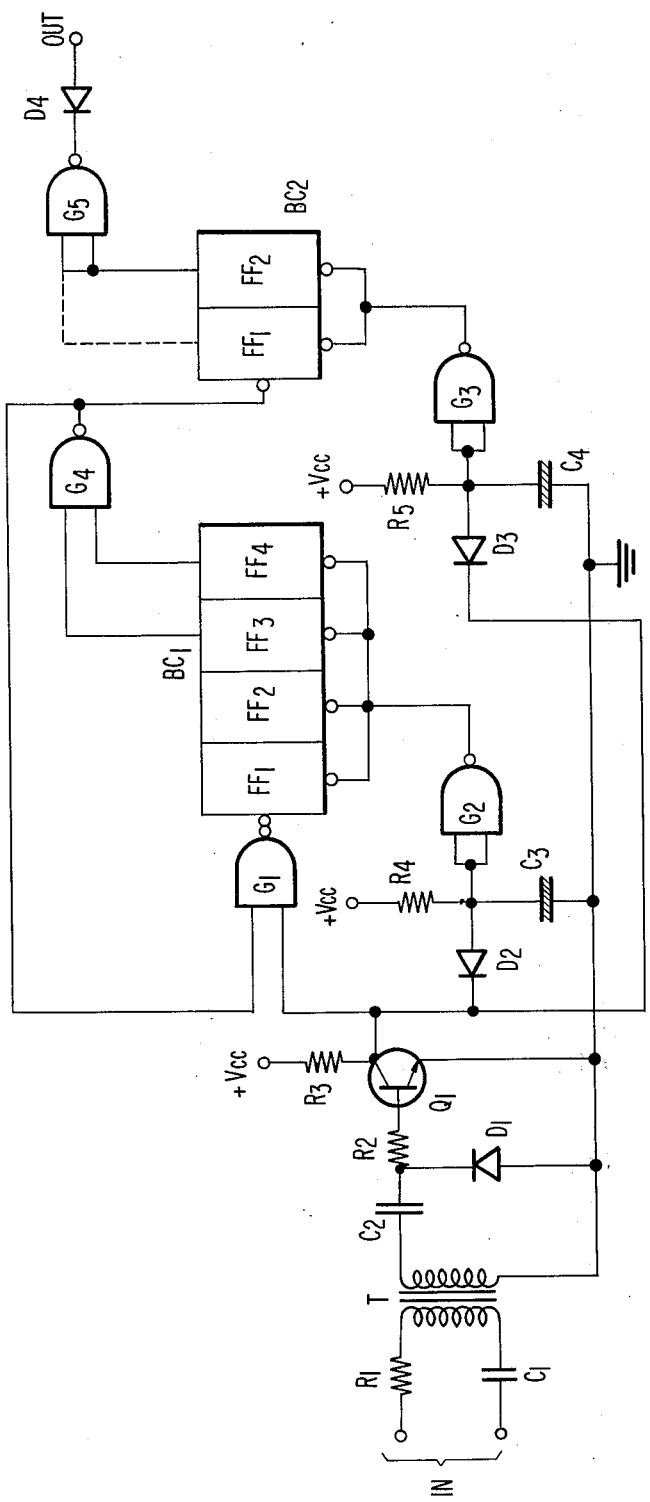

START CIRCUIT FOR TELEPHONE ANSWERING DEVICE

BACKGROUND OF THE INVENTION

1. Field of the Invention

This invention relates to a start circuit for an automatic telephone answering device, which distinguishes between a bell signal and crosstalk noise, such as a dial signal.

2. Description of the Prior Art

Conventional start circuits operate by rectifying an incoming telephone line signal, integrating the rectified signal by applying it to a capacitor, and operating a switching circuit, e.g. a Schmitt trigger, when the capacitor voltage exceeds a predetermined level. Circuits of this type frequently and erroneously respond to extraneous noise signals on the line, such as dial signals, however, since they are unable to distinguish between bell and dial signals.

SUMMARY OF THE INVENTION

An object of the present invention is thus to provide a start circuit capable of distinguishing between bell and dial signals by counting the number of pulses or oscillations in each continuous input or line signal pattern, and actuating an associated answering device or the like only when a predetermined count is reached in two or more successive input signal sequences.

BRIEF DESCRIPTION OF THE DRAWING

The accompanying drawing shows a schematic block diagram of a circuit embodiment for implementing the concept of the present invention.

DETAILED DESCRIPTION OF THE PREFERRED EMBODIMENT

In the drawing, input terminals IN connect a telephone line to an input resistor $R_1$, a coupling capacitor $C_1$, and the primary winding of a line transformer T. The secondary winding is connected to a coupling capacitor $C_2$ and a halfwave rectifying diode $D_1$, whose output is applied to the base of a transistor $Q_1$ through a resistor $R_2$. The emitter of transistor $Q_1$ is grounded, and the collector thereof is connected to one of the input terminals of a two-input NAND gate $G_1$ and, through diodes $D_2$ and $D_3$, to a pair of time constant circuits, one comprising a resistor $R_4$ and a capacitor $C_3$ and the other comprising a resistor $R_5$ and a capacitor $C_4$. Capacitors $C_3$ and $C_4$ are respectively connected to NAND gates $G_2$ and $G_3$, the two input terminals of which are short-circuited whereby they function as NOT circuits. The output terminals of NAND gates $G_2$ and $G_3$ are connected to the reset terminals of a four-bit binary counter $BC_1$ (first counter) and a two-bit binary counter $BC_2$ (second counter), respectively. The output of NAND gate $G_1$ is connected to the count terminal of the first counter, and the third and fourth register stages thereof, $FF_3$ and $FF_4$, are connected to the input terminals of a two-input NAND gate $G_4$. The output of this NAND gate thus becomes low after twelve pulses are applied to the first counter (0011). The output of NAND gate $G_4$ is connected to the other input terminal of NAND gate $G_1$, and to the count terminal of the second counter $BC_2$. The second register stage $FF_2$ of the second counter is connected to both input terminals of a two-input NAND gate $G_5$, which thus produces a low level output after two pulses are applied to the second counter (01). The output of NAND GATE $G_5$ is connected to the cathode of a diode $D_4$, and the overall start circuit output terminal OUT is coupled to the anode of diode $D_4$.

In operation, when the input terminals IN receive a bell signal or a series of dial pulses, a positive pulse is applied to the base of transistor $Q_1$ through diode $D_1$. Transistor $Q_1$ is thus rendered conductive, and repeatedly switches ON and OFF in response to each input pulse. When transistor $Q_1$ is turned ON by the first pulse, capacitors $C_3$ and $C_4$ are instantly discharged through diodes $D_2$ and $D_3$, respectively. As a result the outputs of NAND gates $G_2$ and $G_3$ are raised, which enables the first and the second counters $BC_1$ and $BC_2$. The pulse outputs of transistor $Q_1$ are thus applied to and accumulated in the first counter through NAND gate $G_1$.

When dial pulses are applied to the input terminals, the output of NAND gate $G_4$ never drops to a low level because the maximum number of pulses in each dial series is ten, and approximately 0.3 second after the termination of each dial series the first counter is reset by the charging capacitor $C_3$ and the attendant lowering of the output of NAND gate $G_2$. Thus, twelve dial pulses can never be accumulated in the first counter $BC_1$ before it is reset, regardless of how many dial signal series are received. Consequently, the output of gate $G_4$ remains high and no counts are registered in the second counter $BC_2$.

When a 16 Hz bell signal is received, however, twelve pulses are registered in the first counter $BC_1$ in three-fourths of a second, whereby the output of gate $G_4$ drops and further counting is stopped by the feedback to the input gate $G_1$. At the same time, the lowered output of gate $G_4$ is registered as one count in the second counter $BC_2$. As is well known, the standard 16 Hz bell signal has a repeating pattern of a one second duration followed by a two second rest period which is referred to herein as the blank time. When such a signal pattern is applied to the circuit of the invention, therefore, the output of gate $G_5$ drops after the second 16 Hz bell signal is received, whereby the OUT terminal is lowered through diode $D_4$ and the telephone answering device or the like connected thereto is activated.

The time constant of resistor $R_5$ and capacitor $C_4$ at the input of NAND gate $G_3$ is set at about 5 seconds, whereby the second counter is reset after 5 seconds if a caller hangs up after the first ring. As shown by the dotted line in the drawing, if both input terminals of NAND gate $G_5$ are separately connected to the first and second stages $FF_1$ and $FF_2$ of the second counter, the gate output will not drop until three 16 Hz bell signals have been received.

What is claimed is:

1. A start circuit for a telephone answering device or the like for distinguishing between a bell signal having a repeating burst pattern with a blank time between bursts and more than a predetermined number of cycles in each burst, and noise signal bursts, such as dial signals, having a variable number of cycles in each burst less than the predetermined number, comprising:
   (a) means for generating pulses in response to input signal bursts,
   (b) a first counter for registering the number of cycles in each input signal burst,
   (c) means connecting said pulses generated by said generating means to said first counter, (d) means for resetting the first counter after the termination of each input signal burst,
(e) a second counter for registering the number of times the first counter reaches said predetermined number, and
(f) means for producing a bell signal recognition signal in response to the second counter reaching a predetermined count.

2. A start circuit as defined in claim 1, further comprising first logic gate means having its inputs connected to selected stages of the first counter corresponding to said predetermined number, and having its output connected to a count terminal of the second counter.

3. A start circuit as defined in claim 1, wherein said blank time between bell signal bursts is a predetermined time, and further comprising means for resetting the second counter after the expiration of a time delay greater than said predetermined time after the termination of each input signal burst, and means for disabling said second counter resetting means in response to each input signal burst.

4. A start circuit as defined in claim 2, wherein the blank time between bell signal bursts is a predetermined time, and further comprising means for resetting the second counter after the expiration of a time delay greater than said predetermined time after the termination of each input signal burst, and means for disabling said second counter resetting means in response to each input signal burst.

5. A start circuit as defined in claim 2, wherein said connecting means comprises a second logic gate means for supplying said pulses to a count terminal of said first counter, and wherein said start circuit further comprises means connecting the output of said first logic gate means to an input of said second logic gate means to disable the latter when said first counter reaches said predetermined number.

6. A start circuit as defined in claim 4, wherein said connecting means comprises a second logic gate means for supplying said pulses to a count terminal of said first counter, and wherein said start circuit further comprises means connecting the output of said first logic gate means to an input of said second logic gate means to disable the latter when said first counter reaches said predetermined number.

* * * * *